United States Patent [19]

Kawakami et al.

[11] Patent Number: 4,678,727
[45] Date of Patent: Jul. 7, 1987

[54] SODIUM-SULFUR CELL BLOCK

[75] Inventors: Mitsuo Kawakami; Hiroyuki Kawamoto, both of Hitachi, Japan

[73] Assignee: Hitachi, Ltd., Tokyo, Japan

[21] Appl. No.: 802,194

[22] Filed: Nov. 25, 1985

[30] Foreign Application Priority Data

Nov. 28, 1984 [JP] Japan .................. 59-251378

[51] Int. Cl.$^4$ .................................. H01M 2/30
[52] U.S. Cl. ...................... 429/104; 429/158; 429/160; 429/178
[58] Field of Search ............... 429/160, 161, 158, 157, 429/178, 99, 100, 104

[56] References Cited

U.S. PATENT DOCUMENTS

| 4,041,216 | 8/1977 | Desplanches et al. | 429/104 |
| 4,443,523 | 4/1984 | Hasenauer | 429/99 |
| 4,546,056 | 10/1985 | Jessen et al. | 429/156 X |

Primary Examiner—Anthony Skapars
Attorney, Agent, or Firm—Antonelli, Terry & Wands

[57] ABSTRACT

A sodium-sulfur cell block having a plurality of sodium-sulfur cells is attached to, and held by, common terminals at both ends of the cells and in the long axes directions of the cells. In order to absorb thermal stress generated between the cells and the common terminals, at least one end is cantilevered at said common terminal.

11 Claims, 6 Drawing Figures

SODIUM-SULFUR CELL BLOCK

DESCRIPTION OF THE INVENTION

1. Field of the Invention

The present invention relates to a sodium-sulfur cell block, and particularly to a sodium-sulfur cell block which is suited for absorbing thermal stress generated across common terminals when the sodium-sulfur cells are provided in a plurality of numbers, and which is suited to firmly secure the single cells.

2. Background of the Invention

The sodium-sulfur cell has heretofore been known as a secondary cell of the type of operating at high temperatures, which is capable of being charged or discharged at a temperature of about 300° C. to about 350° C. The sodium-sulfur cells are often used being combined in a plurality of numbers, resulting in a block.

According to the above sodium-sulfur cell block, single cells 2 are arranged in a plurality of numbers in parallel in a frame 1 as shown in FIG. 4. The individual cells are connected at both ends in the direction of long axis to common terminals 4 via single cell terminals 3 as shown in FIG. 5 which is a section view along the line A—A of FIG. 4. The single cell terminals 3 are fastened by bolts to the common terminals 4 as shown in FIG. 6, and are further welded to the sodium-sulfur cells.

As mentioned above, however, the sodium-sulfur cells are used at a temperature of from 300° C. to 350° C. Therefore, the cylindrical single cells are particularly elongated in the direction of long axis to affect the common terminals 4 via cell terminals 3. Accordingly, the common terminals 4 are often damaged.

In addition to the above-mentioned sodium-sulfur cell block, a block has been proposed in which the individual cells are fastened to the common terminals via wires, as well as a block which employs a slide system for fastening the cell terminals to the common terminals. With the former block in which the single cells are fastened by wires, however, swinging develops when the sodium-sulfur cell block is moved. With the latter block, on the other hand, sparking occurs at the cell terminals that are supported in a sliding manner by the common terminals.

Japanese Utility Model Laid-Open No. 57862/1984 discloses another sodium-sulfur cell block in which the single cells are tilted. With this block, however, the single cells are subject to swing when it is moved, just like the above-mentioned block of the type supported by wires.

SUMMARY OF THE INVENTION

The present invention is designed to provide a sodium-sulfur cell block which absorbs thermal stress that generates between the single cells and the common terminals, and which prevents said common terminals from breaking.

The present invention is concerned with a sodium-sulfur cell block having a plurality of sodium-sulfur cells, both ends each of which in the direction of long axis being intimately attached to, and held by, common terminals, wherein at least one end of each of the sodium-sulfur cells in the direction of long axis is cantilevered at the common terminal. With the thus constructed sodium-sulfur cell block of the present invention in which the single sodium-sulfur cells are cantilevered at the common terminal, thermal stress generated between the single cells and the common terminals while the sodium-sulfur cells are being used is absorbed, so that the common terminals are prevented from breaking.

DETAILED DESCRIPTION OF THE INVENTION

Figure 1:
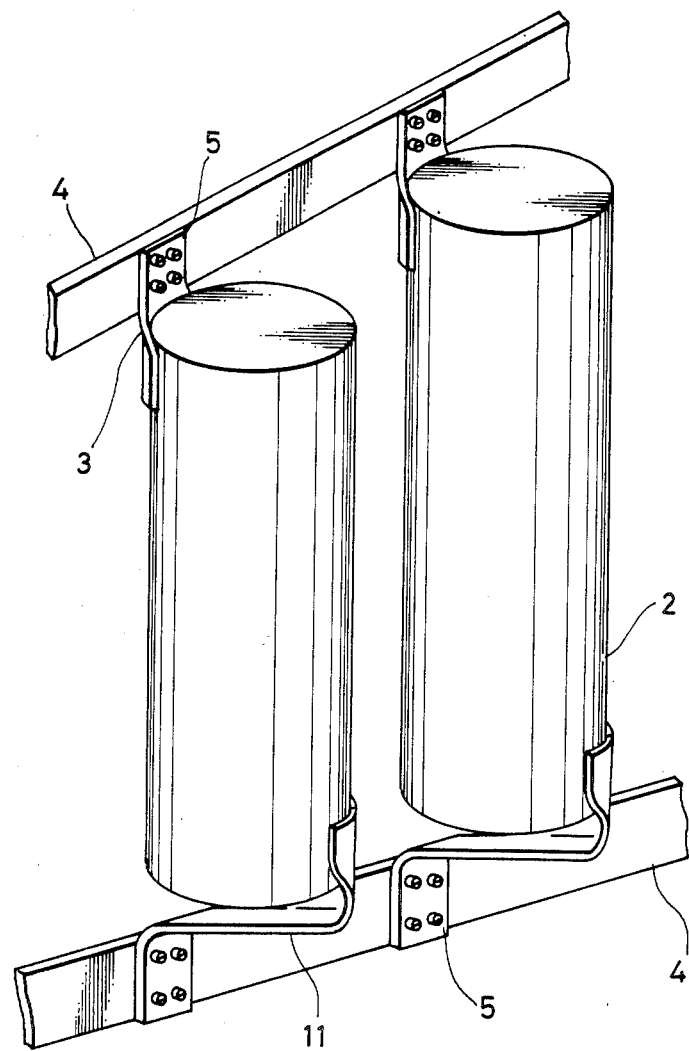
FIGS. 1 to 3 are diagrams showing the structure of portions where single cells in a sodium-sulfur cell block of the present invention are joined to a common terminal.

Preferred embodiments of the sodium-sulfur cell block of the present invention will be described below in detail in conjunction with the accompanying drawings. In the following description, the portions corresponding to those mentioned in the background of the invention are denoted by the same reference numerals and are not explained.

FIG. 1 is a diagram showing the structure of a sodium-sulfur cell block according to an embodiment of the present invention, wherein the cell terminals 11 are welded in an L-shape to the lower portion of single cells 2 on the side opposite to the cell terminal 4. The common terminal 11 is welded to the single cell 2 at a position where the center of the cell terminal 11 is located at a point where a tangential line of the single cell 2 in parallel with the common terminal 4 comes into contact with the single cell.

The longer the cantilever region the region between portions secured to the common terminal and welded to the single cell 2) of the cell terminal 11, the more deformation is absorbed when the single cells 2 are being used. However, increasing the length of the cantilever region makes it difficult to realize a cell block of compact size. Therefore, the length of the cantilever region is determined by taking into consideration the balance between the possible deformation when the cells are being used and the size of the block. Usually, the length of the cantilever region is set to be equal to the diameter of the single cell 2, as shown in FIG. 1. The length of the cantilever region of the cell terminal 11 can be adjusted by moving the common terminal 4 under the single cell 2 relative to the single cell 2. It can also be contrived to weld the terminal 11 to a side portion of the single cell 2. In this case, however, the terminal 11 must be twisted once to connect to the common terminal 4. The cell terminal 11 which is twisted is not desirable from the standpoint of absorbing the thermal stress of the single cell 2.

The cell terminal 11 must have a thickness of several millimeters to absorb the thermal stress of the single cell 2 in the direction of long axis and to firmly hold the single cell 2. Further, the cell terminal 11 must have a width which is several times as great as the thickness thereof, so as to have a sufficient modulus of section for the external force other than the force in the direction of long axis. Depending upon the size of the single cell 2, however, thickness and width of the cell terminal 11 can be adjusted.

The above embodiment has been the case where the single cell is cantilevered at the lower end thereof in the direction of long axis. However, the single cell 2 can also be cantilevered at the upper end thereof by the cell terminal 11. Furthermore, the single cell can be cantilevered only at the upper end thereof. However, to fasten the single cell 2 to the common terminals 4 in a cantilevered manner both at the upper and lower ends thereof, is difficult because it is difficult to determine the position in the direction of long axis and manufacturing process. Most desirably, therefore, the single cell 2 should be cantilevered at the lower end thereof.

Like the conventional art, the cell terminal 11 is made of the same material as the common terminal 4, i.e., made of a material (usually copper) which forms the electrodes. Further, the cell terminal 11 is welded to the single cell 2 to firmly bond them together. The cell terminal 11 may be fastened to the single cell 2 by screws instead of being welded.

Another embodiment of the invention will be described below.

Figure 2:
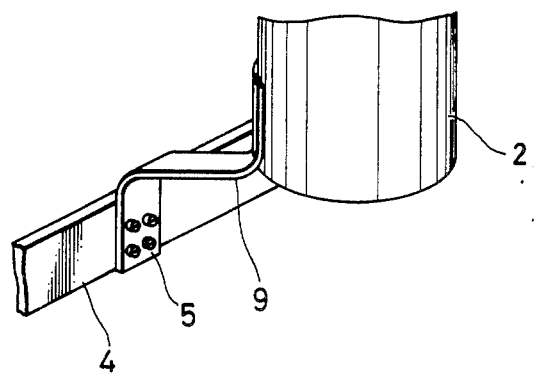

FIG. 2 shows a cell terminal 11 of an L-shape like the embodiment of FIG. 1. However, what makes a difference is that the cell terminal 11 is joined to the single cell 2 on the same side as the common terminal 4. The cell terminal 11 is so welded that the center of the cell terminal 11 comes to a point where a tangential line in parallel with the common terminal 4 comes into contact with the single cell 2 on the same side as the common terminal 4.

The cantilevered cell terminal 11 of this embodiment absorbs the thermal stress generated by the single cell 2 like the cell terminal that is shown in FIG. 1. When the cell block is taken into consideration, however, the length consisting of the diameter of the single cell 2 and the cantilever region of the cell terminal 11 determines the size of the cell block in the lateral direction. From the standpoint of realizing a compact cell block of size, therefore, it is desired to adopt the embodiment of FIG. 1 in which the cantilever region of the cell terminal 11 is superposed on the diameter of the single cell 2.

Figure 3:
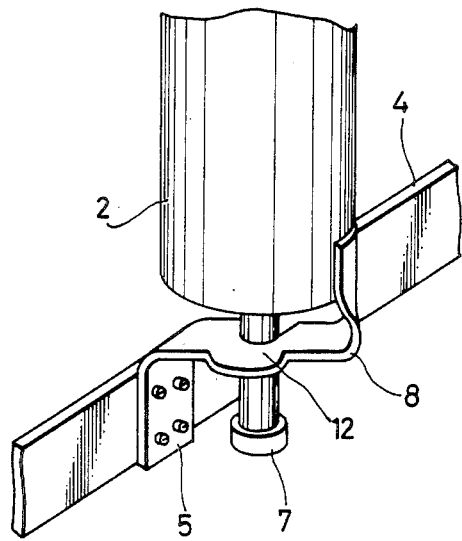
Figure 4:
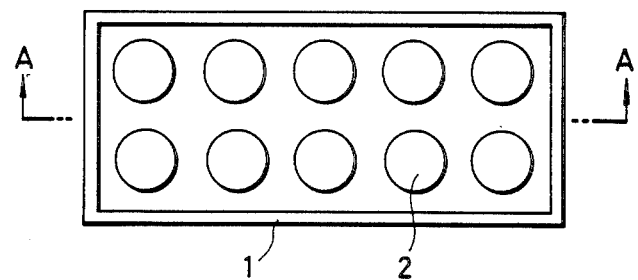
FIG. 4 is a section view showing a conventional sodium-sulfur cell block.
Figure 5:
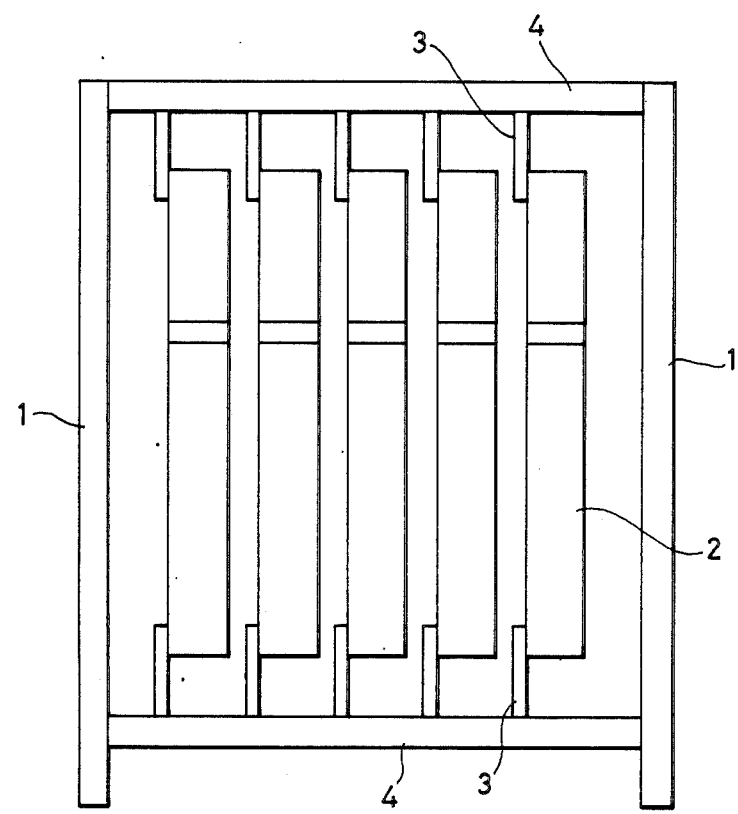
FIG. 5 is a section view along the line A—A of FIG. 4.
Figure 6:
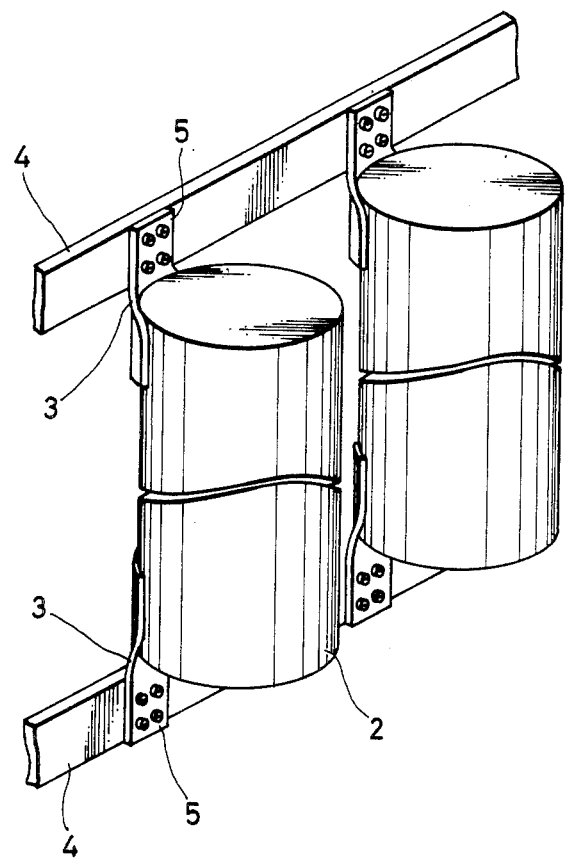
FIG. 6 is a diagram showing a conventional structure for joining the single cells and the common terminals.

Next, FIG. 3 shows the case where a pipe 7 is provided at the lower end of the single cell 2 in the embodiment of FIG. 1 to introduce an inert gas into the single cell 2. In this case, the cantilever region of the cell terminal 11 should be provided with a region to bypass the projection such as pipe. In this case, furthermore, a circular reinforcing portion 12 should be provided on the side opposite to the bypassing region to produce increased strength against the external force of the lateral direction.

According to the sodium-sulfur cell block of the present invention as described above, the thermal stress that generates at a junction portion between the single cell and the common terminal is absorbed, and the common terminal is prevented from breaking. Furthermore, even if a portion of the single cell is broken, other single cells are not affected, and the external force is prevented from exerting on the common terminal.

What is claimed is:

1. A sodium-sulfur cell block having a plurality of sodium-sulfur cells, both ends of each cell in the direction of its long axis, being firmly attached to common terminals, characterized in that at least one end of said sodium-sulfur cell in said direction of the long axis is secured to one of said common terminals by a cell terminal comprising an elongated member, one end of said elongated member being secured to said one common terminal and the other end of said elongated member being secured to said cell, said elongated member projecting as a cantilever in a direction trarsverse to the long axis of a cell so that said other of the elongated member is spaced from said one common terminal to form a cantilever region extending between a portion of said one common terminal secured to one end of said elongated member and a portion of said cell secured to the other end of said elongated member.

2. A sodium-sulfur cell block according to claim 1, wherein said one end of said cell is a lower end of said cell.

3. A sodium-sulfur cell block according to claim 2, wherein the other end of said cell terminal is formed in an L-shape and is connected to the lower portion of said cell on the side opposite to said one common terminal.

4. A sodium-sulfur cell block according to claim 2, wherein the other end of said cell terminal is formed in an L-shape and is connected to the lower portion of said cell on the same side as said one common terminal.

5. A sodium-sulfur cell block according to claim 4 or claim 4, wherein the center of said cell terminal is located at a point where a tangential line of said cell in parallel with said common terminal comes into contact with said cell.

6. A sodium-sulfur cell block according to claim 5, wherein length of the cantilever region is set to be equal to about diameter of said cell.

7. A sodium-sulfur cell block according to claim 6, wherein thickness of said cell terminal is larger than width thereof.

8. A sodium-sulfur cell block according to claim 2, wherein each of said cells is provided with a pipe to introduce an inert gas into each cell, said pipe extending downwards from said lower portion of each cell, the cantilever region of said cell terminal being provided with a region to bypass said pipe, and a circular reinforcing portion being provided on a side of said cell terminal opposite to the bypassing region to produce increased strength against external force in a lateral direction.

9. A sodium-sulfur cell block comprising:
a plurality of sodium-sulfur cells;
an upper common terminal to which an upper end of each of said sodium-sulfur cells is electrically and mechanically connected;
a lower common terminal disposed along lower ends of said sodium-sulfur cells; and
a plurality of cell terminals each of which is adapted to secure a lower end of each of said sodium-sulfur cells to said lower common terminal, one end of each of said cell terminals being secured to said lower common terminal and the other end of the cell terminal being secured to one of said cells, the other end of said cell terminal being spaced from the lower common terminal to define a cantilever region extending between the ends of the cell terminal and under the lower end of said one of said cells.

10. A sodium-sulfur cell block according to claim 9 wherein each of said cell terminals has a thickness that is smaller than the width thereof, said thickness of the cell terminal extending in a direction along a long axis of said one of said cells secured by said cell terminal.

11. A sodium-sulfur cell block according to claim 10, wherein a length of said cell terminal between the end secured to said common terminal and the end to said cell is greater than the diameter of the cell secured thereto.

* * * * *